Patented June 18, 1946

2,402,325

UNITED STATES PATENT OFFICE 2,402,325

OIL SOLUTIONS OF BASIC ALKALINE EARTH METAL SULPHONATES AND METHOD OF MAKING SAME

William K. Griesinger, Drexel Hill, and Edmond H. Engelking, Upper Darby, Pa., assignors to The Atlantic Refining Company, Philadelphia, Pa., a corporation of Pennsylvania No Drawing. Application August 19, 1943, Serial No. 499,296

4 Claims. (Cl. 252—33)

The present invention relates to the production of hydrocarbon oil solutions of alkaline earth metal sulphonates, and more particularly to the preparation and purification of compositions comprising a viscous hydrocarbon oil solution of basic calcium sulphonate.

An object of this invention is the production of relatively low viscosity or fluid solutions of calcium sulphonate in viscous mineral oil, such solutions being characterized by their basic reaction to phenolphthalein indicator and their ability to function as lubricants, components of lubricants, or rustproofing agents. The basic nature of these compositions renders them extremely valuable in inhibiting rusting or corrosion of metals under conditions in which acidity is present or normally tends to develop. Such compositions are of particular utility as lubricants for internal combustion engines, since they function not only as antirust agents but also as detergents for maintaining engine cleanliness.

It has been proposed heretofore to incorporate by various methods "detergents" such as calcium petroleum sulphonate in lubricating oil designed for use in internal combustion engines. In one procedure, oil-soluble sodium sulphonates derived as a by-product in the manufacture of mineral white oil were transposed to calcium sulphonate by treatment with reactive calcium compounds, and the resulting calcium sulphonate was then admixed with lubricating oil. In another procedure, oil-soluble sulphonic acids were isolated from sulphuric acid treated hydrocarbon oil, and the free sulphonic acids in substantially pure condition were added to the lubricating oil and thereafter neutralized with a basic calcium compound to produce calcium sulphonate in the oil. In a third procedure, the hydrocarbon stock was subjected to sulphonation, and after removal of sludge, the resulting hydrocarbon solution of sulphonic acids was neutralized with an aqueous slurry or suspension of hydrated lime. All these methods have been open to objection as involving either unnecessary and uneconomical steps such as the isolation of the free sulphonic acids or their sodium salts and their subsequent transposition to calcium sulphonates, or as in the case of the third procedure mentioned, the difficulties encountered in the formation of emulsions which rendered the method impracticable in commercial operations.

A recently proposed method for the production of oil solutions of calcium sulphonate which obviates the difficulties respecting the formation of emulsions resides in the neutralization of the sulphonated hydrocarbon oil with substantially dry lime. However, while this method avoids troublesome emulsions, the purification of the calcium sulphonate oil solution is rendered difficult due to the high viscosity of the solution and/or the gelatinous nature of the calcium sulphonate contained in the oil. During the neutralization of the sulphonated oil, it is necessary to employ lime in a quantity slightly in excess of that required to completely neutralize the oil-soluble sulphonic acids. The resulting oil therefore contains not only the oil-soluble calcium sulphonate, but also unreacted lime, calcium sulphate, and other undesirable solid materials. In most cases, due to the concentration of the calcium sulphonate and its gelatinous nature, the viscosity of the oil is too high to permit essential removal of the solid materials by filtration, except at relatively high temperatures. Furthermore, the oil solution of calcium sulphonate produced by this and other prior art processes is usually slightly acidic, even though a slight excess of lime is employed during the formation of the sulphonate. For example, an oil solution containing about 30% of calcium sulphonate usually exhibits an acidity of 0.2 to 0.4 mg. KOH per gm. when titrated in 50% alcohol using a phenolphthalein indicator. We have found that these undesirable features may be overcome by our method of processing, and that we are able to produce fluid solutions of calcium sulphonate having a basic reaction, as more fully set forth hereinafter.

In accordance with our invention a suitable lubricating oil stock such as a naphthenic oil distillate or a solvent extract fraction obtained by the selective solvent treatment of hydrocarbon oil, is subjected to sulphonation by contacting with a sulphonating agent, e. g., sulphuric acid of high concentration at a temperature sufficiently elevated as to produce maximum sulphonation without excessive loss to acid sludge. Temperatures between 150° F. and 175° F., and preferably between 160° F. and 170° F., using 98% sulphuric acid have been found particularly suitable. The resulting acid sludge is separated from the oil, and to the oil containing oil-soluble sulphonic acids is added powdered hydrated lime in an amount greatly in excess of that required to neutralize the oil. The proper quantity of lime is determined by titrating the sour oil with a base using 50% alcohol as the solvent and phenolphthalein as the indicator and then adding from 180% to 220%, and preferably from 210% to 220%, of the lime required for complete neutralization as indicated by the titration. In other words, the amount of lime used is from 80% to 120% in excess of that required for the formation of calcium disulphonate $Ca(SO_3R)_2$, where R is the hydrocarbon oil radical. The powdered lime is thoroughly dispersed in the oil with vigorous agitation, as by air blowing, and the mixture is then heated with open steam to an elevated temperature, for example, 220° F. to 230° F. The steaming is continued for sufficient time to effect reaction of the lime with the sulphonic acids contained in the oil to form what is believed to be basic calcium sulphonate $CaOH.SO_3R$. A period of 1 to 2 hours steaming is usually sufficient, during which time some of the steam is condensed and the resulting water is commingled with the oil-lime mixture. In this manner neutralization of the oil is obtained without the formation of emulsions which are normally encountered when neutralizing with lime slurry as proposed in the prior art. The mixture, upon completion of the neutralization and steaming is maintained at a temperature of about 180° F. and is blown with air to remove residual moisture. The oil at this stage contains oil-soluble basic calcium sulphonate, as well as undesirable solid materials such as calcium sulphate, unreacted lime, and other impurities. However, the viscosity of the oil is relatively low as compared with calcium sulphonate oil solutions prepared by prior art methods, and such oil may be readily freed of suspended solid material by filtration.

The oil solution containing oil-soluble basic calcium sulphonate and solid materials is filtered through a medium capable of retaining the solid materials, such as a paper or a cloth filter at a temperature between 150° F. and 220° F., and the solid materials are thereby removed from the oil. In order to facilitate the filtration, a small amount of filter aid, such as "Hyflow-Super-Cel" is added to the oil prior to filtration. If it is desired to increase the concentration of basic calcium sulphonate in the oil, the solution after the filtration step may be subjected to distillation, preferably under reduced pressure, to remove at least a portion of the oil content. The resulting oil, after such concentration procedure, may contain of the order of 15% to 40% by weight of basic calcium sulphonate, and has an alkaline reaction. For example, an oil solution containing 30% by weight of basic calcium sulphonate exhibits an alkalinity equivalent to 5.5 to 6.5 mg. KOH per gm. This concentrate may be employed as a base material for blending with lubricating oil of desired viscosity in order to incorporate in the oil the desired amount of basic calcium sulphonate to function as a "detergent" or rust preventive. In the event that it is not desired to remove at least a portion of the oil from the basic calcium sulphonate oil solution, the distillation step may be eliminated, and the oil may be utilized directly as a lubricant, with or without the addition of other agents such as antioxidants, corrosion inhibitors, film strength agents, and the like.

When it is desired to produce oil solutions of sulphonates of the alkaline earth metals other than calcium, we may employ the basic compounds of strontium, barium, and magnesium, utilizing the technique hereinbefore described.

We claim:

1. The method of producing a hydrocarbon oil solution of a basic alkaline earth metal sulphonate, which comprises intimately contacting hydrocarbon oil with a sulphonating agent, separating the oil containing oil-soluble sulphonic acids from the spent sulphonating agent, and reacting the oil solution of sulphonic acids at 220° F. to 230° F., in the presence of steam, with 80% to 120% of a basic alkaline earth metal compound in excess of that required to form a neutral sulphonate.

2. The method of producing a hydrocarbon oil solution of basic calcium sulphonate, which comprises intimately contacting hydrocarbon oil with concentrated sulphuric acid, separating the oil containing oil-soluble sulphonic acids from the acid sludge, and reacting the oil solution of sulphonic acids at 220° F. to 230° F., in the presence of steam, with 80% to 120% of lime in excess of that required to form a neutral sulphonate.

3. In the method of producing a hydrocarbon oil solution of basic calcium sulphonate, the step which comprises reacting an oil solution of sulphonic acids at 220° F. to 230° F., in the presence of steam, with 80% to 120% of lime in excess of that required to form a neutral sulphonate.

4. The method of producing a hydrocarbon oil solution of basic calcium sulphonate, which comprises intimately contacting a viscous hydrocarbon oil with sulphuric acid at a temperature between 150° F. and 175° F., separating the oil containing oil-soluble sulphonic acids from the spent sulphuric acid and acid sludge, adding to the treated oil 80% to 120% of dry lime in excess of that required to form a neutral sulphonate, heating the mixture with open steam to a temperature between 220° F. and 230° F. to cause reaction of the lime with the oil-soluble sulphonic acids to form basic calcium sulphonate, drying the oil mixture, and removing from the dried oil insoluble solid materials.

WILLIAM K. GRIESINGER.
EDMOND H. ENGELKING.